United States Patent
Segal et al.

(10) Patent No.: US 7,155,225 B2
(45) Date of Patent: Dec. 26, 2006

(54) METHOD AND APPARATUS IN A WIRELESS COMMUNICATION SYSTEM FOR FACILITATING A HANDOFF

(75) Inventors: Niranjan N. Segal, Arlington, TX (US); Anatoly S. Belkin, Glenview, IL (US); Alex P. Hirsbrunner, Bloomingdale, IL (US); Ajaykumar Idnani, Schaumburg, IL (US); Jennifer Pierce, Algonquin, IL (US)

(73) Assignee: Motorola, Inc., Schaumburg, IL (US)

( * ) Notice: Subject to any disclaimer, the term of this patent is extended or adjusted under 35 U.S.C. 154(b) by 144 days.

(21) Appl. No.: 10/652,125

(22) Filed: Aug. 29, 2003

(65) Prior Publication Data

US 2005/0047435 A1    Mar. 3, 2005

(51) Int. Cl.
*H04Q 7/20* (2006.01)
(52) U.S. Cl. .............. 455/436; 455/435.1; 455/440; 455/422.1; 370/661; 370/466
(58) Field of Classification Search ............ 455/436, 455/435.1, 440, 422.1; 370/661, 466
See application file for complete search history.

(56) References Cited

U.S. PATENT DOCUMENTS

| 7,039,028 B1* | 5/2006 | Chen et al. ............. 370/331 |
| 2004/0030791 A1* | 2/2004 | Dorenbosch et al. ....... 709/230 |
| 2004/0264410 A1* | 12/2004 | Sagi et al. ............. 370/331 |
| 2005/0047435 A1* | 3/2005 | Segal et al. ............. 370/466 |
| 2005/0048972 A1* | 3/2005 | Dorenbosch et al. ....... 455/436 |

\* cited by examiner

*Primary Examiner*—Jean Gelin
*Assistant Examiner*—S. Smith
(74) *Attorney, Agent, or Firm*—Simon B. Anolick

(57) ABSTRACT

A dual-band wireless subscriber unit (SU) (112) having an enterprise address of E1 and a cellular address of C1, corresponding method (200), software program (310–320), and WLAN (104) determines (202) that the SU is about to leave a wireless local area network (WLAN) (104). In response, when the SU is involved in a call on E1, the SU sends (212, 208) to the WLAN a SIP message, for example a Refer message with a "Refer To" field of C1 if an ongoing call or a SIP Redirect message with a contact address of C1 if a new call is attempting to begin on E1. In response to receiving either message, the WLAN seamlessly transfers (210, 214) the call to C1.

10 Claims, 2 Drawing Sheets

METHOD AND APPARATUS IN A WIRELESS COMMUNICATION SYSTEM FOR FACILITATING A HANDOFF

FIELD OF THE INVENTION

This invention relates in general to wireless communication systems, and more specifically to a method and apparatus for facilitating a handoff of a subscriber unit from a wireless local area network to a wide area network.

BACKGROUND OF THE INVENTION

Multi-band portable subscriber units (SUs) are becoming available that can communicate in a wireless local area network (WLAN) as well as in a wide area network (WAN), such as a cellular network. Such SUs "register" with the WLAN and communicate through the WLAN when within the coverage area of the WLAN. When outside the coverage area of the WLAN, such SUs are "de-registered" from the WLAN, and communicate through the WAN.

When the SU does not have a call in progress, the registration and de-registration processes are relatively straightforward. In one prior-art embodiment, the SU is expected to re-register periodically with the WLAN. In the absence of a timely re-registration, the WLAN de-registers the SU and will forward all future calls for the SU to the WAN, until the SU again registers with the WLAN. A problem arises, however, when the SU has a call in progress or a new call is received for the SU just as the SU is about to leave the coverage area of the WLAN. Such calls are likely to be dropped.

Thus, what is needed is a method and apparatus for facilitating a handoff of the SU from the WLAN to the WAN. The handoff preferably will provide a seamless, standards-compliant mobility between the two administrative domains when the SU is leaving the coverage area of the WLAN and moving into the WAN.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages in accordance with the present invention.

DETAILED DESCRIPTION OF THE PREFERRED EMBODIMENT

In overview, the present disclosure concerns communications systems that utilize multi-band portable subscriber units to provide service for users thereof operating therein. More particularly, various inventive concepts and principles embodied as methods and apparatus in a wireless communication system for facilitating a handoff for use in equipment with such communications systems will be discussed and disclosed. The communications systems of particular interest are those being deployed and developed such as Wi-Fi (Wireless Local Area Networks based on IEEE 802.11), CDMA (Code Division Multiple Access), W-CDMA (Wideband-CDMA), 3G (Generation), UMTS (Universal Mobile Telecommunications Services), iDEN™, GSM (Global System for Mobile communications) systems and evolutions thereof, although the concepts and principles have application in other systems and devices.

The instant disclosure is provided to further explain in an enabling fashion the best modes of making and using various embodiments in accordance with the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms, if any, such as first and second, top and bottom, and the like are used solely to distinguish one from another entity or action without necessarily requiring or implying any actual such relationship or order between such entities or actions.

Much of the inventive functionality and many of the inventive principles are best implemented with or in one or more conventional processors, or with integrated circuits (ICs) such as custom or application specific ICs. It is expected that one of ordinary skill, notwithstanding possibly significant effort and many design choices motivated by, for example, available time, current technology, and economic considerations, when guided by the concepts and principles disclosed herein will be readily capable of programming such processors, or generating such ICs with minimal experimentation. Therefore, in the interest of brevity and minimization of any risk of obscuring the principles and concepts according to the present invention, further discussion of such processors and ICs, if any, will be limited to the essentials with respect to the principles and concepts employed by the preferred embodiments.

Figure 1:
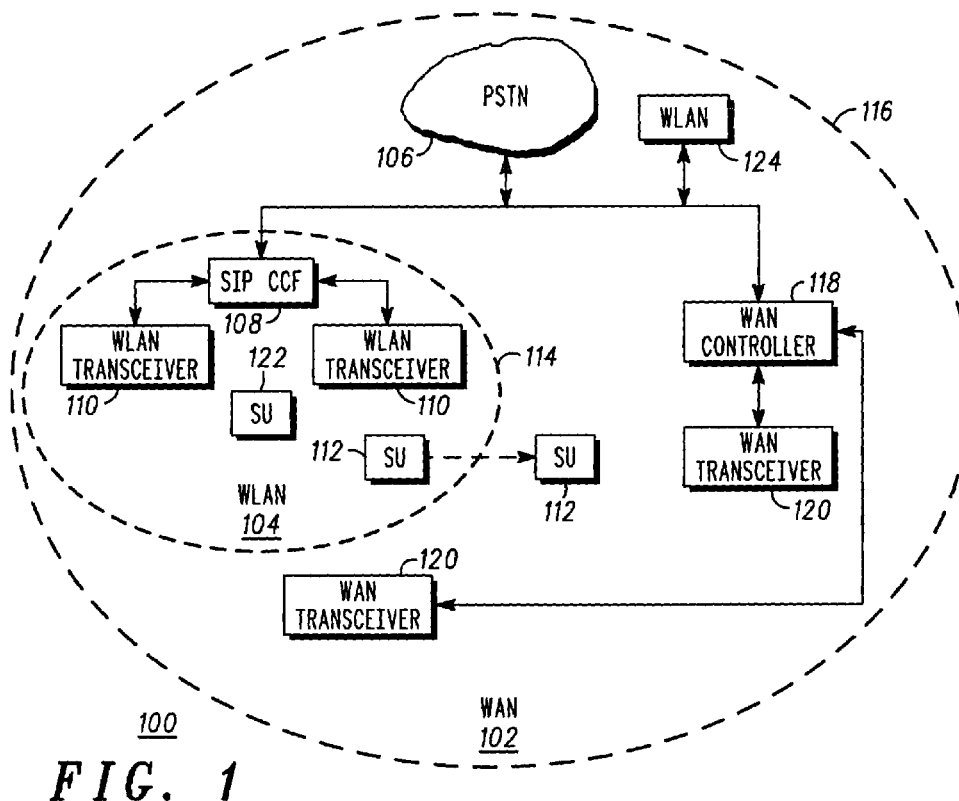
FIG. 1 is a simplified block diagram of an exemplary wireless local area network (WLAN) operating within a wide area network (WAN) and supporting a wireless subscriber unit (SU).

Referring to FIG. 1, a simplified block diagram 100 depicts an exemplary wireless local area network (WLAN) 104, e.g., a conventional Wi-Fi network, operating within or partially within a wide area network (WAN) 102, e.g., a conventional cellular network, and supporting communications with at least one wireless subscriber unit (SU) 112 in accordance with the present invention. The SU 112 preferably is a dual-band unit assigned to an enterprise address E1 and to a cellular address C1, for enabling communications in both the WLAN 104 and the WAN 102. The coverage area of the WAN 102 is represented by a first ellipse 116, while that of the WLAN 104 is represented by a second ellipse 114.

The WLAN 104 comprises at least one WLAN transceiver 110 for supporting wireless communications of the SU 112 within the WLAN 104. The WLAN 104 is preferably assigned to a Session Initiation Protocol (SIP) domain. The WLAN 104 further comprises a SIP call control function (CCF) 108, e.g., a conventional SIP-enabled private branch exchange, for handling communications external to, as well as internal or inside the WLAN 104. Communications external to the WLAN 104 preferably include communications with the public switched telephone network (PSTN) 106, as well as with a conventional WAN controller 118 coupled to at least one conventional WAN transceiver 120 for supporting communications with the SU 112. In addition, the WLAN 104 can communicate with another similar WLAN 124 and can support other SIP-enabled SUs, such as the SU 122. It will be appreciated that, alternatively, the WLAN 104 and the SU 112, 122 can instead substitute for SIP a protocol similar to SIP, e.g., the H.232 protocol often used in Europe.

Figure 2:
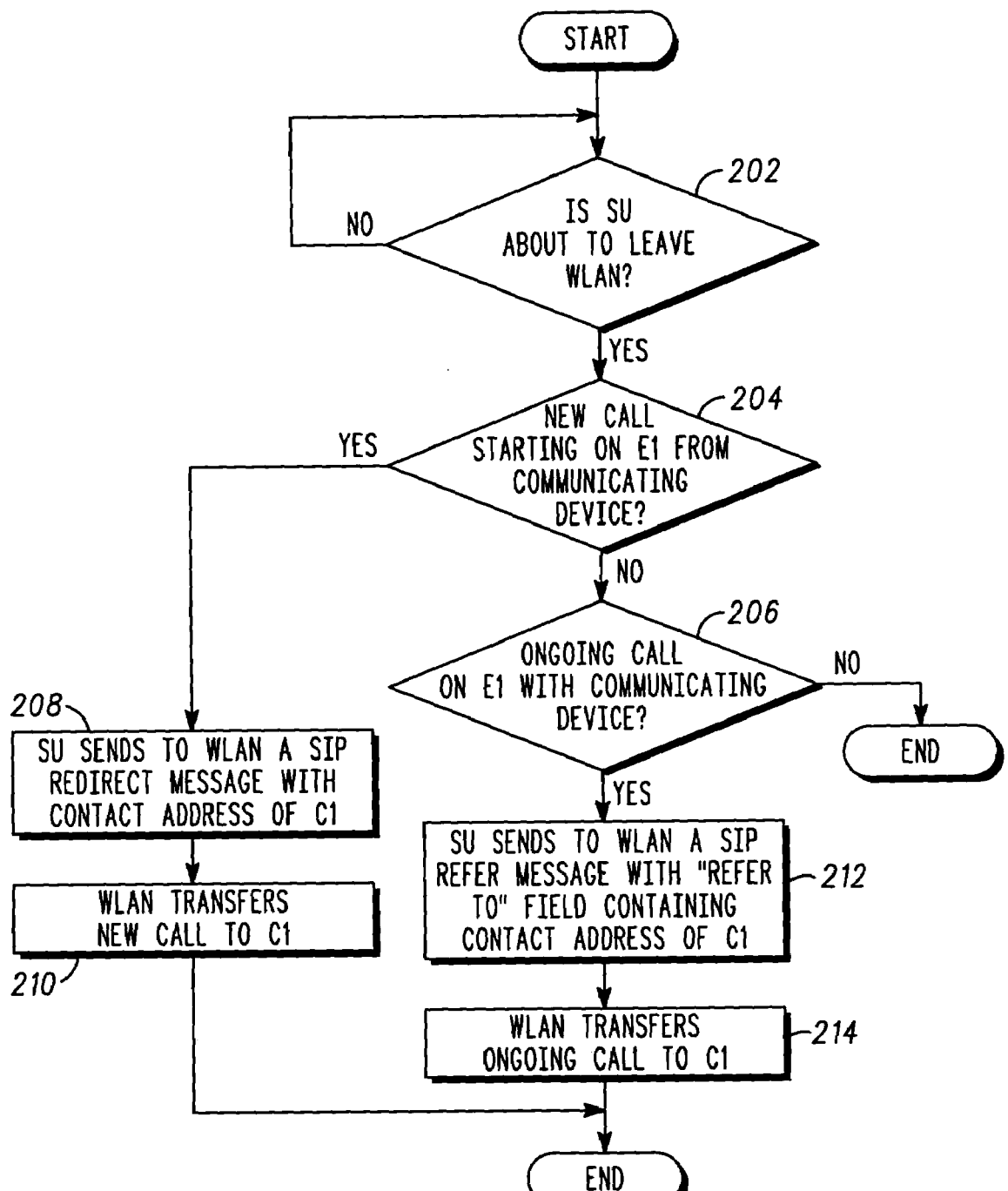
FIG. 2 is a flow diagram depicting operation of a handoff of the SU from the WLAN to the WAN.

FIG. 2 is a flow diagram 200 depicting operation of a handoff of the SU 112 from the WLAN 104 to the WAN 102. The flow begins with the SU 112 determining 202 whether it is about to leave the WLAN 104. This determination is preferably made by calculating a signal quality estimate (SQE), e.g., a bit error rate, through well-known techniques, and comparing the SQE with a predetermined threshold. If the SQE is less than the predetermined threshold, the SU 112 concludes that it is about to leave the WLAN 104. Otherwise, the SU 112 concludes it is not about to leave the WLAN 104.

If the SU 112 determines that it is about to leave the WLAN 104, the SU 112 checks 204 whether there is a new call attempting to begin on the enterprise dress E1 from a communicating device. If not, the SU 112 checks 206 whether there is an ongoing call on E1 with the communicating device. If not, no handoff is needed, and the process ends.

If, on the other hand, at step 204 the SU 112 determines that a new call is attempting to begin on the enterprise address E1, then the SU 112 sends 208 a SIP Redirect message to the WLAN 104 with a contact address of C1. Then, in response to the Redirect message, the WLAN 104 transfers 210 the new call to C1. In a first embodiment of the WLAN 104, the SIP CCF 108 transfers the new call. In a second embodiment of the WLAN 104, when the communicating device is SIP-enabled, the WLAN 104 can forward the Redirect message to the communicating device, which will itself transfer the call. In the second embodiment, the communicating device can be, for example, another SIP-enabled SU in the WLAN 104, such as the SU 122. Alternatively, the communicating device can be another SIP-enabled SU in another WLAN, such as the WLAN 124, having a SIP domain different from the SIP domain of the WLAN 104. In a third embodiment, when the communicating device is outside the WLAN, the SIP CCF transfers the new call. In the third embodiment, when the communicating device is a second SU, which is SIP-enabled, inside the WLAN, the WLAN preferably forwards the SIP Redirect message to the second SU, which will itself transfer the call.

If, instead, at step 206 the SU 112 determines that there is an ongoing call on E1 with a communicating device, then the SU 112 sends 212 a SIP Refer message to the WLAN 104 with a "Refer To" field containing the contact address of C1. Then, in response to the Refer message, the WLAN 104 transfers 214 the ongoing call to C1. In the first embodiment of the WLAN 104, the SIP CCF 108 transfers the ongoing call. In the second embodiment of the WLAN 104, when the communicating device is SIP-enabled, the WLAN 104 can forward the Refer message to the communicating device, which will itself transfer the call. It will be appreciated that, in the second embodiment, the SIP-enabled communicating device can be a SU inside the WLAN 104, such as the SU 122. Alternatively, the SIP-enabled communicating device can be a SU outside the WLAN 104 in a different SIP domain having SIP connectivity with the SIP domain of the WLAN 104, e.g., a SU in the WLAN 124.

Figure 3:
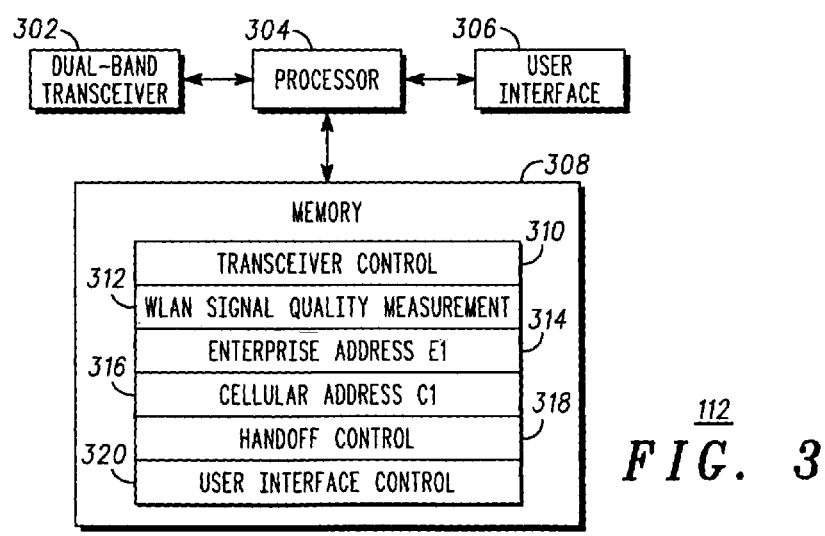
FIG. 3 is an electrical block diagram of an embodiment of the subscriber unit.

FIG. 3 is an electrical block diagram of an embodiment of the SU 112, comprising a conventional dual-band transceiver 302 for communicating wirelessly on two frequency bands. The dual-band transceiver is preferably similar to a combination of a Wi-Fi transceiver and a cellular transceiver, both of which are readily available from Motorola, Inc. and others. The SU 112 further comprises a conventional processor 304 coupled to the dual-band transceiver 302 for controlling the dual-band transceiver 302. The processor 304 is preferably a member of the MC68000 family of processors available from Motorola, Inc. The SU 112 also includes a user interface 306 coupled to the processor 304 for interfacing with a user. The user interface 306 preferably includes a conventional display and keypad, among other things.

In addition, the SU 112 includes a conventional memory 308 coupled to the processor 304 for storing a software program comprising executable instructions for programming the processor in accordance with the present invention. The memory 308 comprises a transceiver control program 310 for programming the processor 304 to control the dual-band transceiver 302 according to the communication protocols used in the WLAN 104 and the WAN 102. The memory 308 further comprises a WLAN signal quality measurement program 312 for programming the processor 304 to cooperate with the dual-band transceiver 302 to measure, through well-known techniques, a signal quality estimate (SQE) of a wireless signal sent between the WLAN 104 and the SU 112. The memory 308 also includes spaces 314, 316 for storing an enterprise address E1 and a cellular address C1 assigned to the SU 112.

The memory 308 further comprises a handoff control program 318, which facilitates a handoff of the SU 112 from the WLAN 104 to the WAN 102. The handoff control program 318 preferably programs the processor 304 to cooperate with the dual-band transceiver 302 to determine (preferably from the measured SQE) whether the first SU 112 is about to leave the WLAN 104. In response to determining that the SU 112 is about to leave the WLAN 104, when the SU 112 has one of (a) an ongoing first call on E1 and (b) a new call attempting to begin on E1, the handoff control program 318 further programs the processor to send to the WLAN one of (c) a SIP Refer message with a "Refer To" field containing a contact address of C1, and (d) a SIP Redirect message with a contact address of C1. More specifically, in response to determining that the SU 112 is about to leave the WLAN 104, when the SU 112 has a new call attempting to begin on E1, the handoff control program 318 programs the processor 304 to send to the WLAN the SIP Redirect message. Further, in response to determining that the SU 112 is about to leave the WLAN 104, when the SU 112 has an ongoing call on E1, the handoff control program 318 programs the processor 304 to send to the WLAN the SIP Refer message. The memory 308 also includes a conventional user interface control program 320 for programming the processor 304 to control and interact with the user interface 306. Note that SIP Refer and SIP Redirect messages are known messages defined as part of the SIR standards.

Thus, it should be clear from the preceding disclosure that the present invention provides a method and apparatus in a wireless communication system for facilitating a handoff. The method and apparatus advantageously provides a seamless, standards-compliant mobility between the two administrative domains when the SU is leaving the coverage area of the WLAN and moving into the WAN.

This disclosure is intended to explain how to fashion and use various embodiments in accordance with the invention rather than to limit the true, intended, and fair scope and spirit thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

The invention of the claimed is:

1. A subscriber unit (SU) that is SIP enabled for facilitating a handoff of the SU from a SIP-enabled wireless local area network (WLAN), the handoff made to a wireless wide area network (WAN), the SU assigned an enterprise address E1 and a cellular address C1, the SU comprising:
   a dual-band transceiver for communicating wirelessly on two frequency bands; and
   a processor coupled to the dual-band transceiver for controlling the dual-band transceiver, wherein the processor is programmed to:
      cooperate with the dual-band transceiver to determine whether the first SU is about to leave the WLAN;
      determine whether the SU is involved in a call on E1; and
      in response to determining that the SU is about to leave the WLAN, and that the SU is involved with the call on E1,
      send a SIP message with a contact address of C1 to the WLAN, the SIP message resulting in transferring the call from E1 to C1.

2. The SU of claim 1, wherein the processor is further programmed to determine whether the SU has a new call attempting to begin on E1.

3. The SU of claim 2, wherein the processor is further programmed to send a SIP Redirect message in response to determining that the SU has a new call attempting to begin on E1.

4. The SU of claim 1, wherein the processor is further programmed to determine whether the SU has an ongoing call on E1.

5. The SU of claim 4, wherein the processor is further programmed to send a SIP Refer message with a "Refer To" field containing the contact address of C1, in response to determining that the SU has an ongoing call on E1.

6. A wireless local area network (WLAN) assigned to a Session Initiation Protocol (SIP) domain, for facilitating a handoff of a subscriber unit (SU) from the WLAN to a wireless wide area network (WAN), the SU being a dual-band unit assigned an enterprise address E1 and a cellular address C1, the WLAN comprising:
   the SU;
   a WLAN transceiver for supporting wireless communications with the SU;
   a SIP call control function (CCF) coupled to the WLAN transceiver for controlling the WLAN transceiver and further coupled to an external network for handling communications with the external network;
      wherein the SU is arranged and programmed to:
         determine whether the SU is about to leave the WLAN;
         determine whether the SU is involved in a call on E1; and
      in response to determining that the SU is about to leave the WLAN, and that the SU is involved with the call on E1,
         send a SIP message with a contact address of C1 to the WLAN, and
      wherein the WLAN is arranged and programmed in response to receiving the SIP message, to transfer the call from E1 to C1.

7. The WLAN of claim 6, wherein the SU is further arranged and programmed to determine whether the SU has a new call attempting to begin on E1.

8. The WLAN of claim 7, wherein the SU is further arranged and programmed to send a SIP Redirect message in response to determining that the SU has a new call attempting to begin on E1.

9. The WLAN of claim 6, wherein the SU is further arranged and programmed to determine whether the SU has an ongoing call on E1.

10. The WLAN of claim 9, wherein the SU is further arranged and programmed to send a SIP Refer message with a "Refer To" field containing the contact address of C1, in response to determining that the SU has an ongoing call on E1.

* * * * *